INVENTORS
FRITZ SCHLEICH
WILHELM SCHEFFELS

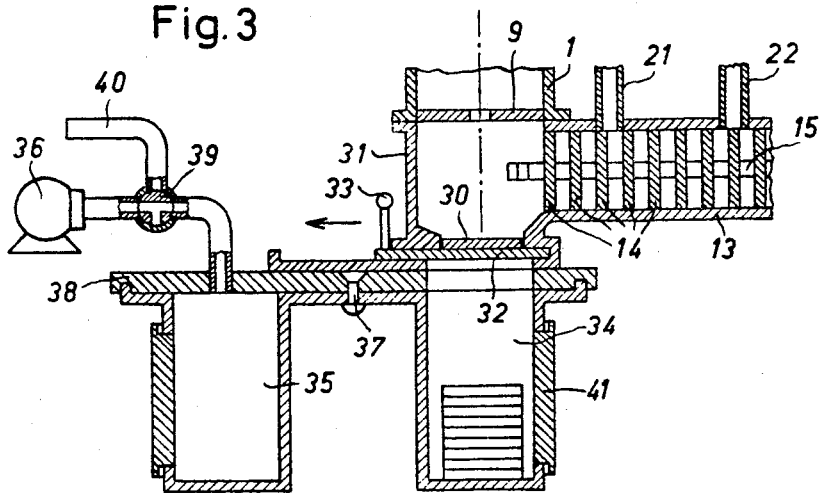
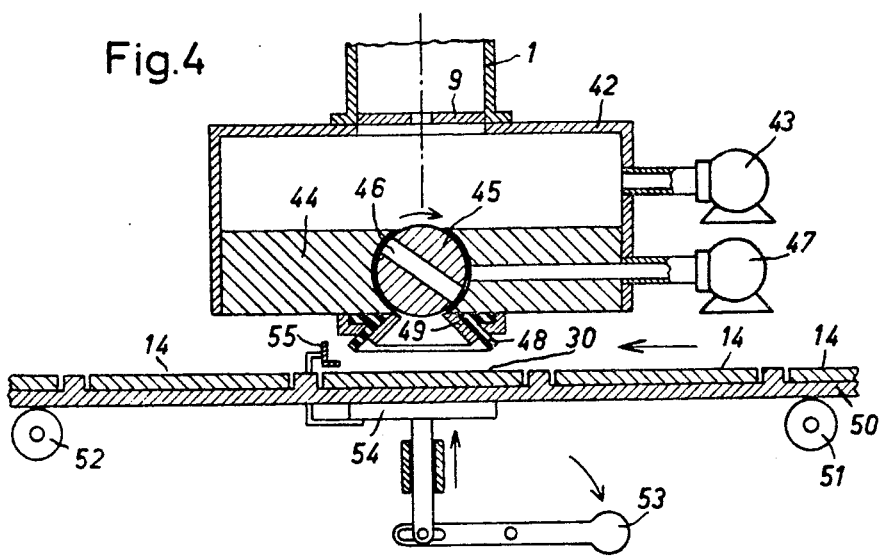

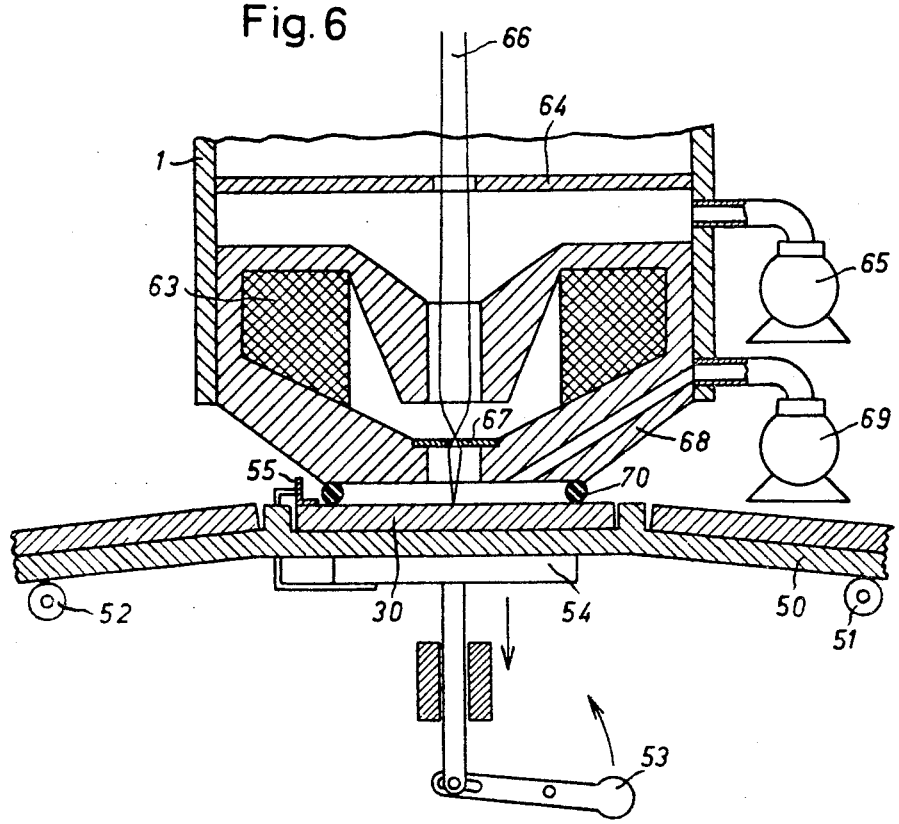
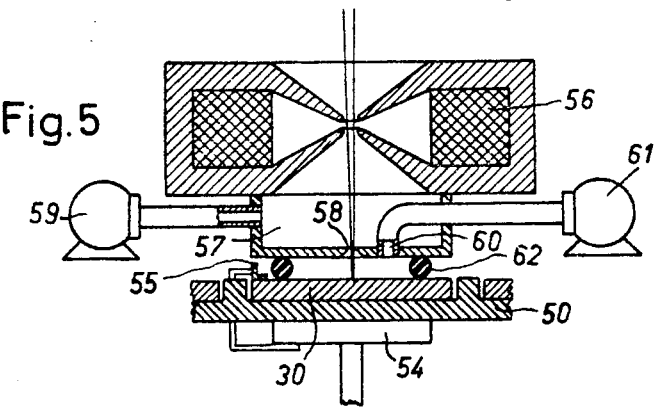

United States Patent Office 3,401,249
Patented Sept. 10, 1968

3,401,249
APPARATUS FOR THE MACHINING OF MATERIAL BY MEANS OF A BEAM OF CHARGE CARRIERS
Fritz Schleich, Unterkochen, Wurttemberg, and Wilhelm Scheffels, Aalen, Wurttemberg, Germany, assignors, by mesne assignments, to United Aircraft Corporation, East Hartford, Conn., a corporation of Delaware
Filed July 9, 1963, Ser. No. 293,776
7 Claims. (Cl. 219—69)

ABSTRACT OF THE DISCLOSURE

Apparatus having a vacuum chamber in which workpieces are machined by a beam of charge carriers. The workpieces are supplied to the chamber through a passage that communicates with the atmosphere and there are conveyor means for advancing successive workpieces, in spaced relation to one another, along the passage and into the machining chamber. The combined transverse cross-section of the conveyor means and each workpiece is substantially the same as that of the passage so that the conveyor means and workpieces seal the passage against entrance of air from the end of the passage which communicates with the atmosphere. A vacuum pump withdraws air from between successive workpieces in the passage. For large workpieces the machining chamber can be formed by providing a seal between contiguous workpiece and apparatus faces. The sealing means can be a resilient gasket, a liquid having a low vapor-pressure, or a very narrow air gap.

*Background and summary of the invention*

This invention relates to material handling equipment and, more particularly, relates to apparatus for the movement of a plurality of objects from atmospheric pressure into a vacuum for working by an impinging beam of charge carriers.

In the machining of material by means of a beam of charge carriers, the workpieces which are to be machined must be arranged in a vacuum. This brings about problems of machining technique, particularly in mass production. In such production, there is always the necessity of machining a large number of pieces in the shortest time. In the machining of workpieces by means of a beam of charge carriers, the actual machining time is generally very short and is scarcely important, as compared with time which is required for the transportation of the workpiece to and from the work place.

For the machining of small pieces, such as watch tools, spinneret nozzles or microelectronic components, it is known to place the pieces in magazines and to arrange these magazines completely in a vacuum. In the vacuum, there is then furthermore provided a conveyor device which transports the workpieces from the storage magazine to the work point, and after machining has been effected, brings them from the work place to a discharge magazine. The storage and discharge magazines can be airlocks. In the case of this apparatus, the pumping times of the locks coincide with the total machining time for all workpieces in the machining chamber. When using a larger number of magazines and locks, the machining process can be made even somewhat more fluid, but the fundamental disadvantage of this device, namely the large vacuum volume which is necessary remains.

If a large workpiece is to be machined successively at different points, this workpiece is arranged in the vacuum chamber and moved. This also requires a large vacuum volume and accordingly a large expense for apparatus.

It is furthermore known to conduct the beam over pressure stages in air and to carry out the actual machining of the material in the air space. Due to the strong dispersion of the charge carriers in air, this known machining method, however, is very limited in its possible applications.

In mass production, it is a question in almost all cases of machining a plurality of workpieces of the same shape, i.e., for example, of the same diameter or of the same surface outline. For the machining of such workpieces, there is employed the apparatus in accordance with the invention which, with relatively simple construction, solves the problem of keeping the passage time in mass production as short as possible. The apparatus in accordance with the invention can also be used for the machining of a large workpiece at different points, and in this case results in the advantage that the vacuum chamber required can be kept small.

The invention, thus, relates to an apparatus for the successive machining of workpieces by means of a beam of charge carriers. In accordance with the invention, the machining chamber has at least one opening which is in communication with the outer air and the workpieces themselves serve for the sealing-off of this opening.

If there are to be machined a plurality of small workpieces of the same shape which consist of a material which is particularly sensitive to impurities, or if the workpieces are to be drilled through, for example, during the machining, it is advantageous to develop the apparatus in such a manner that the actual machining space is completely in vacuum, and that the workpieces upon their transport into and out of the vacuum seal by their outer contour the machining chamber. For this purpose, it is advisable to connect the machining chamber with a shaft serving to feed the workpieces, one free end of which adjoins the outer air, and to conduct the workpieces by means of a conveyor device in such a manner in said shaft that its outer contour slides on the inner wall of the shaft. At numerous points of the shaft, there are provided, in this connection, pump connections connected with vacuum pumps. In this apparatus, therefore, the workpieces can be introduced in the hollow shaft without special measures. In this shaft, they are grasped by the conveyor belts and conducted into the machining chamber. During the transportation in the feed shaft, the air is drawn off at various points so that therefore individual pressure stages are produced which are sealed off from each other by the outer contour of the workpieces. The pressure in the shaft therefore continuously decreases from the opening to the air to the machining chamber, and finally reaches the required vacuum in the machining chamber.

It may be advantageous to provide for the removal of the workpieces from the machining chamber, another shaft which is constructed in the same manner as the feed shaft. In this case, there is provided in the machining chamber a device which receives each workpiece entering from the conveying device of the feed shaft, brings it into the machinig position and after machining feeds it to the transport device of the shaft serving for the removal of the workpiece. The feeding, the machining and the removal of the workpieces take place in this connection in individually successive cycles. The time between successive machinings corresponds to the time which is necessary in order to feed a machined workpiece to the conveying device of the discharge shaft, and thereupon to conduct a new workpiece to the holding device arranged in the machining chamber. This time can be kept very short, since unutilized pump periods do not occur.

It may be advantageous to develop the new apparatus in such a manner that for the feeding of the workpieces, the said feed shaft forming a pressure-stage system is provided and that with the machining chamber, there is connected a shaft which is under vacuum in which the workpieces are collected after the machining. In this connection, there are provided at least two collecting shafts developed as a revolving air-lock. The time between successive machinings is in the case of this device still somewhat shorter than in the case of the other device mentioned above, since it is here merely necessary after the machining has been effected to convey the workpiece from the holding device into the collecting shaft. If this collecting shaft is filled with machined workpieces, a new preevacuated collecting shaft is brought under the machining chamber without interruption of the vacuum.

If merely surface machinings are to be carried out on a plurality of small workpieces or at several points of a larger workpiece, the workpieces having, for example, flat or uniformly curved surfaces, it is advantageous to carry out the entire transport movement in air and merely to evacuate the machining place of the workpiece and its immediate vicinity in each case for the machining.

Such an apparatus is advisedly so developed that the beam generating chamber contains a device which intermittently opens the beam exit aperture and that the side of the machining chamber opposite the beam exit aperture is formed in each case (upon opening of the beam exit aperture) by a workpiece which is moved in position for machining and is pressed in vacuum tight manner against the walls of the machining chamber. The walls of the machining chamber are in this connection advisedly formed by an elastic packing and there is provided a plunger which is movable in the direction of the beam and which, upon opening of the beam exit aperture presses the workpiece which is to be machined against said packing. The actual machining chamber shrinks in the case of this apparatus to an extremely small volume, just above the actual machining point and can accordingly be evacuated very rapidly after the pressing-on of the workpiece. With this apparatus, the result is obtained that the work-spacing automatically always remains the same, even in case of workpieces of any desired thickness so that therefore the beam of charge carriers need not be refocused.

The apparatus for the intermittent opening of the beam exit aperture can consist of a revolving rotary valve. However, it is also possible to provide other devices, such as a cone which can be swung in and out and which completely closes the beam exit aperture until the pressing-on of the workpiece. In certain cases, it is also possible to dispense completely with the device for the intermittent opening of the beam exit aperture. In this case, it is, however, necessary to provide a beam exit aperture which is as narrow as possible, and to evacuate separately the machining chamber itself, as well as the chamber of the beam generating device which adjoins the machining chamber.

In such an apparatus, the beam exit aperture of the beam generating unit is arranged in the direct vicinity of the beam focus and has an opening corresponding to the beam diameter. Alongside of the beam exit aperture, there is furthermore another opening which is continuously directly in communication with an additional vacuum pump, this opening serving for the continuous evacuation of the machining chamber. The walls of the machining chamber which are developed as packing adjoin the bottom of the beam exit aperture. This packing can, for example, be an elastic rubber packing, but it can also be developed as a liquid packing. For example, a layer of liquid of low vapor pressure can be used as packing.

The side of the machine chamber opposite the beam exit aperture is formed by a workpiece which, during the machining, is pressed in vacuum-tight fashion against the walls of the machining chamber. When using an electromagnetic focusing lens of short focal length in the beam producing unit, the walls of the machining chamber adjoin directly the lower pole shoe, seen in the beam direction, of the focusing lens and this pole shoe is provided with an opening which is connected continuously to a vacuum pump.

It is also possible, and in many cases advantageous to dispense entirely with a lateral sealing of the machining chamber. In this case, the workpiece to be machined in each case is brought so close to the beam exit aperture that the air gap between the surface of the workpiece and the beam exit aperture is so narrow that as a result of the pumping action of the additional vacuum pump, a pressure stage is formed. This pressure stage therefore serves to seal off the machining chamber.

In an apparatus of the type described, it may be advisable to develop the focusing lens in such a manner that it focuses the beam of charge carriers several times, in which case the last focus, seen in the direction of the beam, lies below the lens on the surface of the applied workpiece. The beam exit aperture is in this case arranged at the place of the next to the last focus, i.e., within the lens itself.

Brief description of the drawings

The invention will be explained in further detail which may best be understood by reference to the accompanying drawings, of which:

FIG. 3 is a partially sectioned view of another embodiment of the present invention;

FIG. 4 is a partially sectioned view of still another embodiment of the present invention.

FIG. 5 is a partially sectioned view of still another embodiment of the present invention; and FIG. 6 is a partially sectioned view of still another embodiment of the present invention.

Description of the preferred embodiments

Figure 1:
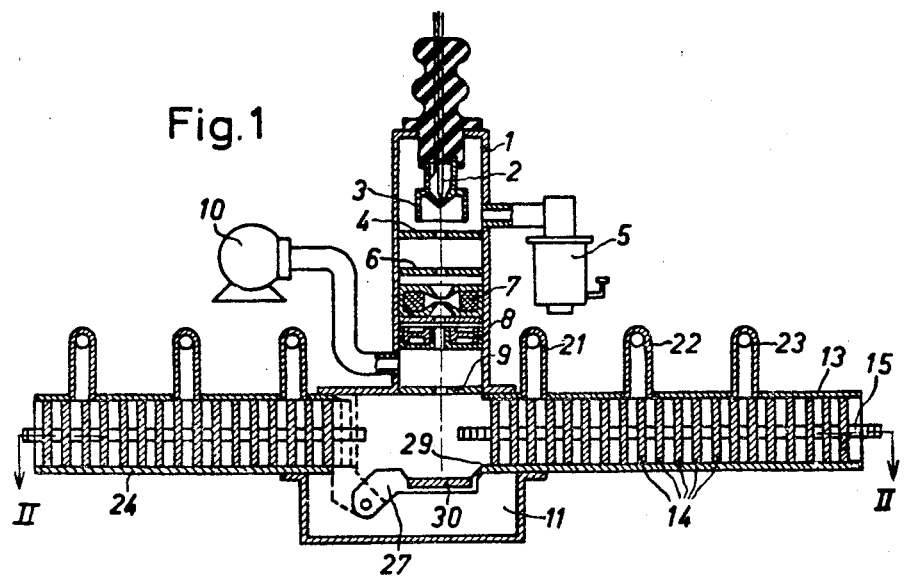
FIG. 1 is a sectioned view of one embodiment of the present invention.
Figure 2:
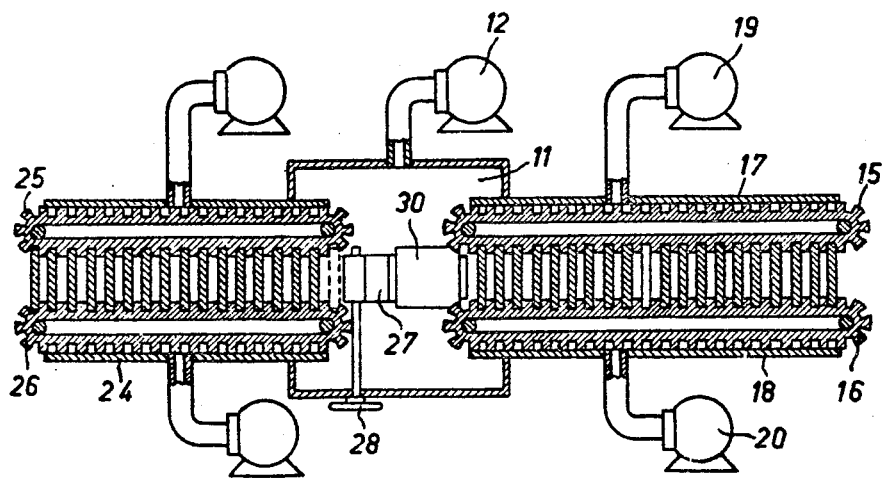
FIG. 2 is a section view taken along lines 2—2 of FIG. 1.

In FIGS. 1 and 2, there is shown a charge carrier beam unit 1 which contains the beam generating system consisting of the cathode 2, the control cylinder 3 and the anode 4. The beam generating chamber is continuously connected with a vacuum pump 5.

Seen in the beam direction below the anode 4, there is arranged an apertured plate 6, an electromagnetic focusing lens 7, an electromagnetic deflection system 8, and the beam exit aperture 9. The space between the beam exit aperture 9 and the deflection system 8 is continuously connected with a vacuum pump 10.

Adjoining the beam exit aperture 9 is the machining chamber 11 connected with a vacuum pump 12. An enclosed, hollow passageway or shaft 13 communicates between chamber 11 and atmospheric pressure, through which the workpieces 14 to be machined are moved. This shaft contains a transport device consisting of the two conveyor belts 15 and 16. These conveyor belts are provided with teeth, between which the workpieces 14 fit. The conveyor belts 15 and 16 extend through the wall of the shaft 13 and are enclosed within housings 17 and 18 respectively which are continuously evacuated by vacuum pumps 19 and 20 respectively.

Shaft 13 is provided with a plurality of pump connections 21, 22 and 23 which are continuously in communication with vacuum pumps.

At the other side of the machining chamber 11, there is provided a hollow open shaft 24 which serves to discharge the workpieces from the machining chamber 11. This shaft 24 is constructed precisely in the same manner as the shaft 13 and contains the two conveyor belts 25 and 26 serving for the conveyance of the machined workpieces.

In the machining chamber 11, there is provided a holding device 27 which can be tilted by means of the actuation knob 28 into the position shown in dashed line in FIG. 1.

The manner of operation of the device shown in FIGS. 1 and 2 is as follows. The workpieces 14 which are to be machined are inserted, one after the other, into the recesses of the conveyor belts 15 and 16. These belts convey the workpieces 14 into shaft 13, the outer contour of the workpieces sliding on the inner wall of said shaft. After a few workpieces have been introduced into the shaft 13 and after a few workpieces have also been arranged in the shaft 24, all the vacuum pumps are connected. The beam generating chamber and the machining chamber are in this connection evacuated to the necessary vacuum. The closing off of the machining chamber from the outside is effected by the workpieces 14 themselves. The pumps connected with the shafts 13 and 24 produce in this connection a vacuum which increases stepwise in the direction toward the machining chamber. After the workpiece which is located close to the operating chamber has reached the point 29 in shaft 13, this workpiece tips, with simultaneous loosening from the conveyor belts 15 and 16, into the holding device 27. Thereupon the conveyor belts 15 and 16 are deenergized and the beam of charge carriers is energized. By means of the beam of charge carriers, the workpiece 30, now lying in a holding device 27, is machined. With corresponding development of the holding device 27, it is possible also to bore or mill the workpiece 30. After the machining of the workpiece 30, the beam of charge carriers is turned off and the holding device 27 is tilted by the actuating knob 28 into the position shown in dashed line in FIG. 1. Now the two conveyor belts 25 and 26 are actuated. They grasp the machined workpiece and transport it into the shaft 24. Thereupon the conveyor belts 25 and 26 are deenergized, the holding device 27 is swung back and the conveyor belts 15 and 16 are again moved until a new workpiece tips into the holding device 27.

If the actual machining time is very short, it is not necessary to deenergize the conveyor belts during the machining.

The process of the feeding and discharging of the workpieces which has been described then takes place continuously.

If the outer contour of the workpieces 14 varies frequently during the course of the manufacture, it is advantageous to develop the device shown in FIGS. 1 and 2 in such a manner that the connecting sections between the suction points 21, 22 and 23 can be replaced.

In the case of the apparatus shown in FIG. 3, there is connected with the beam generating unit 1 a machining chamber 31 which in the same way as the machining chamber 11 shown in FIG. 1 is connected with a shaft 13 serving to feed the workpieces 14. The workpiece 30 to be machined after being transported by the conveyor belts 15 and 16, is again tipped into a holding device, which however in this case is stationary. The workpiece 30 in this connection comes to rest on a slide 32 which can be moved in the direction indicated by the arrow by means of the actuating lever 33. Below the machining chamber 31, there are arranged two collecting containers 34 and 35 developed as a revolving airlock.

The manner of operation of the apparatus shown in FIG. 3 is as follows. After the machining of the workpiece 30, the slide 32 is moved toward the left by means of an arm 33. As a result, the machined workpiece 30 falls into the collecting container 34 which is under the same pressure as the machining chamber 31. During the machining of the workpieces 14, the collecting container 35 is evacuated via the vacuum pump 36. After sufficiently machined workpieces have collected in the collecting container 34, the two containers 34 and 35 are turned around the axis 37 until the container 35 lies below the machining chamber 31. During this rotation of the collecting containers, their openings are closed in vacuum-tight manner by the bottom of the ring 38. After the container 34 is turned into the position of the container 35, the valve 39 is shifted so that therefore the container 34 is now in communication with the vent valve 40. After venting of the collecting container 34, the wall 41 can be removed so that it is possible to remove the machined workpieces. It can be readily seen that in the case of this apparatus, the change of the collecting containers 34 and 35 takes place without interruption of the vacuum in the machining chamber.

In the case of the device shown in FIG. 4, there is connected with the beam generating unit 1 a chamber 42 which is continuously in communication with a vacuum pump 43. This chamber 42 is provided with a housing wall 44 which contains a suitably shaped recess for the ball or roller 45.

The ball 45 is provided with a bore 46 and turns in the direction indicated by the arrow. Between the ball 45 and the housing wall 44, there is a narrow diffusion gap through which air can penetrate from the outer space. This air is continuously drawn off by the two vacuum pumps 47 and 43. The actual machining chamber is formed here by a packing 48 developed as a conical gasket, which is placed on the bottom of the housing wall 44. As support for the packing 48 and as mechanical stop for the workpiece, there is employed an inserted metal ring 49.

The conveyor consists here of a conveyor belt 50, which extends completely in air and is driven by means of the rollers 51 and 52.

The manner of operation of the apparatus shown in FIG. 4 is as follows: After the workpiece 30 which is to be machined has been brought into the position shown in the drawing, the conveyor belt 50 is stopped. The opening 46 of the ball 45 is approximately in the position shown in the drawing. The lever 53 is now pressed down. In this way, the plunger 54 moves upward and presses the workpiece 30 against the gasket 48. The ball 45 thereupon turns to such an extent that its bore 46 lies in the axis of the beam of charge carriers. In this connection, the machining chamber formed by the gasket 48 and the workpiece 30 is evacuated via the vacuum pumps 47 and 43. Thereupon the beam of charge carriers is produced and machines the workpiece 30.

After the machining of the workpiece, the ball 45 is turned so far in the direction indicated by the arrow that the bore 46 no longer couples chamber 42 with the machining chamber. The lever 53 is now pressed upward. In this way, the plunger 54 moves downward and the lever 55 which is firmly connected with this plunger pulls the machined workpiece 30 away from the gasket 48.

In the apparatus shown in FIG. 5, there is provided a focusing lens 56 of short focal length which is in communication with a chamber 57. The chamber 57 contains the beam exit aperture 58 and is in permanent communication with a vacuum pump 59. In the lower wall of the chamber 57, there is provided an opening 60 which is in permanent communication with a vacuum pump 61. Adjoining the bottom of the chamber 57, is a packing ring 62. The workpiece 30 which is to be machined is pressed against this packing ring by means of the plunger 54 in the same manner as in FIG. 4. The machining chamber which consists in this connection of the workpiece 30, the packing ring 62, as well as the lower wall of the chamber 57, is evacuated by means of the vacuum pump 61. After the corresponding vacuum has been established in the apparatus, the beam of charge carriers is energized, and the workpiece 30 is machined.

As can be noted from FIG. 5, in the apparatus shown there the beam generating unit is connected via the beam exit aperture 58 with the outer air until the workpiece 30 which is to be machined has been pressed against the packing ring 62. It must, therefore, be seen to it that the smallest possible amount of gas penetrates into the beam machining chamber through the beam exit aperture 58. The gas which penetrates is drawn off by the vacuum pump 59 and possibly by other pressure stages, not shown here.

In the case of the apparatus shown in FIG. 6, there is provided in the beam generating unit 1 an electromagnetic focusing lens 63 which focuses the beam of charge carriers 66 twice. The space between the diaphragm 64 and the lens 63 is permanently connected with a vacuum pump 65. At the locus of the first focus, the beam exit aperture 67 is arranged, it being developed in the same manner as the aperture 58 in FIG. 5. The second focus lies on the surface of the workpiece 30 to be machined.

The lower pole shoe 68 of the lens 63 is bored and is permanently in communication with a vacuum pump 69. Adjoining the lower pole shoe 68, there is a packing ring 70 against which the workpiece 30 which is to be machined is pressed by means of the plunger 54. The machining chamber which is hereby produced and is formed by the workpiece 30, the packing ring 70 and the lower pole shoe 68 is evacuated via the pump 69. Otherwise the same conditions prevail in the case of the apparatus shown in FIG. 6, as in the case of the apparatus shown in FIG. 5.

If in connection with the devices shown in FIGS. 5 and 6, the focusing lens is so excited that the beam focal point lies just below the beam exit aperture, the packing 62 or 70 can be dispensed with entirely. In this case, the workpiece which is to be machined in each case is brought toward the beam exit orifice into the air gap between the surface of the workpiece and the beam exit aperture is so narrow that as a result of the pumping action, the vacuum pump 61 or 69 forms a pressure stage. This stage then serves to seal off the machining chamber.

The apparatus shown in FIGS. 4, 5 and 6 can also be used for machining a large workpiece at various points. For this purpose, it is merely necessary to replace the conveyor belt 50 by an apparatus which permits a controlled movement of the workpiece in all directions.

It may be desirable to develop the devices shown in FIGS. 1 to 6 in such a manner that the beam generating unit 1 is located below the table plane, the beam of charge carriers extending from the bottom to the top. The machining chamber should then lie approximately in the table plane.

This invention may be variously modified and embodied within the scope of the subjoined claims.

We claim:

1. Apparatus for the successive machining of workpieces by means of a beam of charge carriers, comprising a machining chamber, said machining chamber having at least one passage in communication with atmospheric pressure, a plurality of workpieces for successive transport through said passage to the machining chamber, said passage being of greater length than the machining chamber and of a length to simultaneously contain a plurality of workpieces that are axially spaced from one another, conveyor means that advance the workpieces through said passage and that hold said workpieces in spaced relation to one another, the combined transverse cross-section of the conveyor means and each workpiece being substantially the same as the cross-section of the passage along said length whereby the conveyor means and workpieces partition off successive lengths of the passage into separate pressure chambers in series along the length of the passage to serve as cumulative sealing means to seal off said passage.

2. Apparatus for the successive machining of workpieces by means of a beam of charge carriers, comprising a machining chamber, said machining chamber having at least one passage in communication with atmospheric pressure, a plurality of workpieces for successive transport through said passage to the machining chamber, said passage being of uniform cross-section for an axial distance substantially longer than the combined length of a plurality of workpieces in said passage, conveyor means that advance the workpieces through said passage and that hold said workpieces in spaced relation to one another, the combined transverse cross-section of the conveyor means and each workpiece being substantially the same as the cross-section of the passage along said axial distance whereby the conveyor means and workpieces partition off successive lengths of the passage into separate pressure chambers in series along the length of the passage to serve as cumulative sealing means to seal off said passage, and in which there is a hollow shaft and the passage is the hollow interior of the shaft, said shaft being dimensioned so that the workpieces slidably engage the walls of said shaft, as the conveyor means within said shaft moves said workpieces from the end at atmospheric pressure to the machining chamber, and means along the shaft for withdrawing air from between successive workpieces intermediate the ends of the axial length of the passage that is divided into separate pressure chambers by the axially spaced workpieces and the conveyor means.

3. Apparatus according to claim 2, which includes pump connections positioned at several longitudinally-spaced locations along the shaft for withdrawing air from between different successive workpieces, and vacuum pumps coupled to said pump connections.

4. Apparatus according to claim 2 which includes a second shaft for the removal of the workpieces, said second shaft having a passage therethrough coupling said machining chamber to atmospheric pressure, conveyor means in the passage in said second shaft through which said workpieces move from said machining chamber to a discharge end of the second shaft at atmospheric pressure, the passage through said second shaft being of uniform cross-section for an axial distance substantially longer than the combined length of a plurality of said workpieces, so that the conveyor means and workpieces therein partition off successive lengths of the passage into separate pressure chambers in series with one another along the length of the passage to seal the passage through the second shaft, and pump connections positioned at several longitudinally-spaced locations along the second shaft for withdrawing air from between different successive workpieces, and vacuum pumps coupled to said pump connections.

5. Apparatus according to claim 4, which includes a holding device positioned in the machining chamber to receive the workpiece conveyed into the machining chamber to bring the received piece into the machining position and, after machining, to feed the piece to the conveyor means in said second shaft.

6. Apparatus according to claim 2 which includes an evacuated collecting shaft to collect the machined workpieces.

7. Apparatus for the successive machining of workpieces by means of a beam of charge carriers, comprising a machining chamber, said machining chamber having at least one opening in communication with atmospheric pressure, said workpieces serving to seal off said opening, which opening comprises a shaft coupling said chamber with atmospheric pressure, said shaft being dimensioned so that the workpieces slidably engage the walls of said shaft, and conveyor means within the shaft to move said workpieces from the end at atmospheric pressure to the machining chamber, which apparatus also includes an evacuated collecting shaft to collect the machined workpieces, and in which there are at least two collecting shafts, supporting means for the collecting shafts and on which said shafts have orbital movement about an axis, an evacuating station at a location along the orbit of the shafts, and means sealing the evacuated chamber during its movement from the evacuating station to its collecting position whereby the shafts serve as revolving air locks.

References Cited

UNITED STATES PATENTS

| | | | |
|---|---|---|---|
| 2,747,064 | 5/1956 | Van Pappelendam | 219—78 |
| 2,793,282 | 5/1957 | Steigerwald. | |
| 2,981,823 | 4/1961 | Candidus. | |
| 3,136,882 | 6/1964 | Radtke | 219—121 X |
| 3,136,883 | 6/1964 | Radtke | 219—121 X |
| 3,177,337 | 4/1965 | Kohles | 219—69 |

ANTHONY BARTIS, *Primary Examiner.*

R. F. STAUBLY, *Assistant Examiner.*